(12) United States Patent
Kang et al.

(10) Patent No.: US 9,068,907 B1
(45) Date of Patent: Jun. 30, 2015

(54) POWERTRAIN AND METHOD OF DETERMINING RESIDUAL GAS VOLUME

(71) Applicant: GM Global Technology Operations LLC, Detroit, MI (US)

(72) Inventors: Jun-Mo Kang, Ann Arbor, MI (US); Yongjie Zhu, Troy, MI (US); Yiran Hu, Shelby Township, MI (US); Chen-Fang Chang, Troy, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/270,857

(22) Filed: May 6, 2014

(51) Int. Cl.
*F01N 3/00* (2006.01)
*G01M 15/08* (2006.01)
*F02D 41/00* (2006.01)
*F01N 13/02* (2010.01)
*F01N 13/10* (2010.01)
*F02M 25/07* (2006.01)
*F02D 13/02* (2006.01)

(52) U.S. Cl.
CPC ............... *G01M 15/08* (2013.01); *F02M 25/07* (2013.01); *F02M 25/0707* (2013.01); *F02M 25/0744* (2013.01); *F01N 3/00* (2013.01); *Y02T 10/144* (2013.01); *F02D 13/0207* (2013.01); *F02D 41/00* (2013.01); *F02D 41/005* (2013.01); *F02D 41/0007* (2013.01); *F01N 13/02* (2013.01); *F01N 13/107* (2013.01)

(58) Field of Classification Search
CPC ......... F01N 3/00; F01N 13/107; F01N 13/02; F02D 41/00; F02D 41/007; F02D 41/005; F02D 13/0207; Y02T 10/144; G01M 15/08
See application file for complete search history.

(56) References Cited

U.S. PATENT DOCUMENTS

| 2,838,034 | A  * | 6/1958 | Clark ............................ 123/1 A |
| 8,627,647 | B2 * | 1/2014 | Bression ........................ 60/283 |
| 8,701,409 | B2 * | 4/2014 | Pursifull et al. ............. 60/605.2 |

* cited by examiner

*Primary Examiner* — Hieu T Vo
(74) *Attorney, Agent, or Firm* — Quinn Law Group, PLLC

(57) ABSTRACT

A method can be used to determine the total residual gas volume in a cylinder when the piston of an internal combustion engine is at the bottom dead center (BDC) position. The method includes: (a) measuring an intake manifold pressure and an exhaust manifold pressure; (b) determining a residual gas volume in the at least one cylinder originating from a current engine cycle; (c) determining a residual gas volume in the at least one intake port originating from at least one previous engine cycle; and (d) determining a total residual gas volume when the piston is at a BDC position based, at least in part, on the residual gas volume in the at least one cylinder originating from the current engine cycle and the residual gas volume in the at least one cylinder originating from at least one previous engine cycle.

16 Claims, 2 Drawing Sheets

POWERTRAIN AND METHOD OF DETERMINING RESIDUAL GAS VOLUME

TECHNICAL FIELD

The present disclosure relates to a powertrain and method for determining residual gas volume in an internal combustion engine of the powertrain.

BACKGROUND

A vehicle includes a powertrain for propulsion. The powertrain may include an internal combustion engine for generating output torque. Specifically, the internal combustion engine combusts an air-fuel mixture in order to generate output torque.

SUMMARY

After combustion in an internal combustion engine, residual gases may be pushed into the intake port of the internal combustion engine. Some of these residual gases may be re-inducted into the cylinder of the internal combustion engine during the same engine cycle while another portion of the residual gases may be re-inducted in the next engine cycle. It is useful to determine the residual gases re-inducted in each engine cycle in order to precisely determine the air charge necessary to achieve a desired output torque. Accordingly, the present disclosure describes a method of determining a total residual gas volume when a piston of an internal combustion engine is at the bottom dead center (BDC) position. The internal combustion engine is in fluid communication with an intake manifold and an exhaust manifold. Further, the internal combustion engine includes an engine block, and the engine block defines at least one cylinder. The piston can move within the cylinder. The internal combustion engine further includes at least one intake port and at least one exhaust port. The intake port is in fluid communication with the cylinder and the intake manifold. The exhaust port is in fluid communication with the cylinder and the exhaust manifold. In an embodiment, the method includes the following steps: (a) measuring an intake manifold pressure and an exhaust manifold pressure; (b) determining, via a control module, a residual gas volume in the cylinder originating from a current engine cycle; (c) determining, via the control module, a residual gas volume in the intake port originating from a previous engine cycle; and (d) determining, via the control module, a total residual gas volume when the piston is at the BDC position based, at least in part, on the residual gas volume in the cylinder originating from the current engine cycle and the residual gas volume in the cylinder originating from at least one previous engine cycle.

The present disclosure also relates to a powertrain including a control module specifically programmed to execute the steps of the method described above.

The above features and advantages and other features and advantages of the present invention are readily apparent from the following detailed description of the best modes for carrying out the invention when taken in connection with the accompanying drawings.

DETAILED DESCRIPTION

Figure 1:
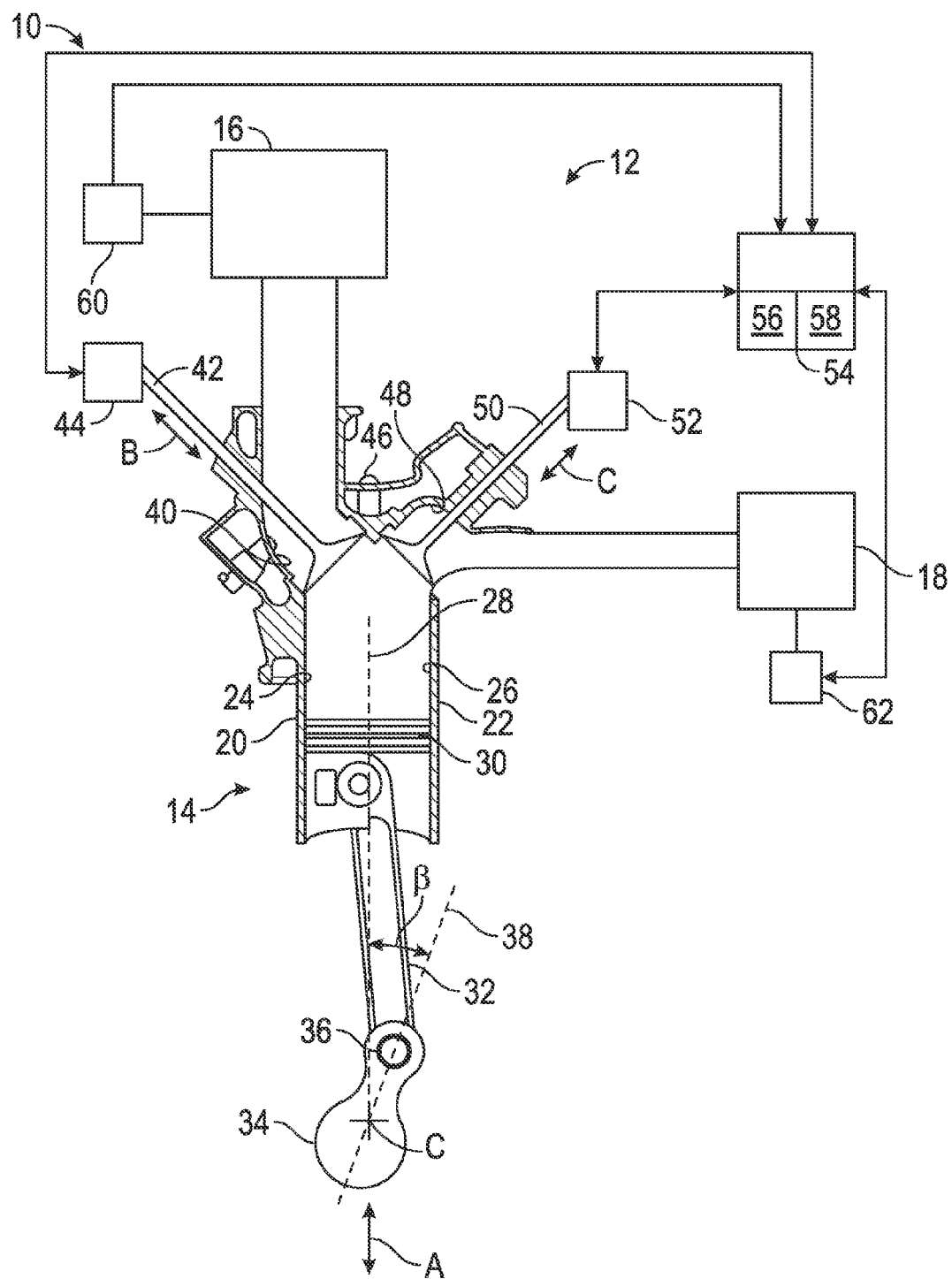
FIG. 1 is a schematic, side, cross-sectional view of a powertrain including an internal combustion engine.

Referring to the drawings, wherein like reference numbers refer to like components, FIG. 1 schematically illustrates a powertrain 12 for propelling a vehicle 10. The vehicle 10 therefore includes the powertrain 12. The powertrain 12 includes an internal combustion engine 14 configured to combust an air-fuel mixture in order to generate output torque. The powertrain 12 further includes an intake manifold 16 in fluid communication with the internal combustion engine 14. The intake manifold 16 is configured to receive fresh air from the atmosphere. Because the intake manifold 16 is fluidly coupled to the internal combustion engine 14, the intake manifold 16 can direct air into the internal combustion engine 14. In addition to the intake manifold 16, the powertrain 12 includes an exhaust manifold 18 in fluid communication with the internal combustion engine 14. Because the exhaust manifold 18 is fluidly coupled to the internal combustion engine 14, the exhaust manifold 18 can receive exhaust gases from the internal combustion engine 14.

The internal combustion engine 14 includes an engine block 20 having at least one cylinder 22. The cylinder 22 has an inner cylinder surface 24 defining a cylinder bore 26. The cylinder bore 26 extends along a bore axis 28. The bore axis 28 thus extends along a center of the cylinder bore 26. The internal combustion engine 14 additionally includes a piston 30 movably disposed inside each cylinder 22. Consequently, the piston 30 can move (i.e., reciprocate) inside the cylinder 22 along the direction indicated by the double arrows A. In particular, the piston 30 can reciprocate along bore axis 28 during the engine cycle.

The internal combustion engine 14 additionally includes a rod 32 pivotally connected to the piston 30. Because of the pivotal connection between rod 32 and the piston 30, the orientation of the rod 32 relative to the bore axis 28 changes as the piston 30 moves along the bore axis 28. The rod 32 is pivotally coupled to a crankshaft 34. Accordingly, the movement of the rod 32 (which is caused by the movement of the piston 30) causes the crankshaft 34 to rotate about its center C. A fastener 36, such as a pin, movably couples the rod 32 to the crankshaft 34. The crankshaft 34 defines a crank axis 38 extending between the center C of the crankshaft 34 and the fastener 36. A crank angle β is defined from the bore axis 28 to the crank axis 38. As the piston 30 reciprocates along the bore axis 28, the crank angle β changes due to the rotation of the crankshaft 34 about its center C. Accordingly, the position of the piston 30 in the cylinder 22 can be expressed in terms of the crank angle β. The piston 30 can move within the cylinder 22 between a top dead center (TDC) position and a bottom dead center (BDC) position. The TDC position refers to the position where the piston 30 is farthest from the crankshaft 34, whereas the BDC position refers the position where the piston 30 is closest to the crankshaft 34. When the piston 30 is in the TDC position, the crank angle β may be zero (0) degrees. When the piston 30 is in the BDC position, the crank angle β may be one hundred eighty (180) degrees.

The internal combustion engine 14 further includes at least one intake port 40 in fluid communication with the intake manifold 16. The intake port 40 is also in fluid communication with the cylinder 22 and therefore fluidly interconnects the intake manifold 16 and the cylinder 22. As a result, gases, such as air, can flow from the intake manifold 16 into the cylinder bore 26.

The internal combustion engine 14 additionally includes at least one intake valve 42 capable of controlling the flow of gases between the intake manifold 16 and the cylinder 22. Each intake valve 42 is partially disposed in the intake port 40 and can move relative to the intake port 40 between an open position and closed position along the direction indicated by double arrows B. When the intake valve 42 is in the open position, gas, such as air, can flow from the intake manifold 16 to the cylinder 22 through the intake port 40. When the intake valve 42 is in the closed position, gases, such as air, are precluded from flowing between the intake manifold 16 and the cylinder 22 through the intake port 40. A first cam phaser 44, which is part of the powertrain 12, can control the movement of the intake valve 42.

As discussed above, the internal combustion engine 14 can combust an air-fuel mixture, thereby producing exhaust gases. At least part of the exhaust gases can flow from the cylinder 22 to the exhaust manifold 18 after combustion. To facilitate combustion, the internal combustion engine 14 may include a spark-plug 46 capable of producing an electric spark in order to ignite the compressed air-fuel mixture in the cylinder 22.

The internal combustion engine 14 additionally includes at least one exhaust port 48 in fluid communication with the exhaust manifold 18. The exhaust port 48 is also in fluid communication with the cylinder 22 and therefore fluidly interconnects the exhaust manifold 18 and the cylinder 22. Thus, exhaust gases can flow from the cylinder 22 to the exhaust manifold 18 through the exhaust port 48.

The internal combustion engine 14 further includes at least one exhaust valve 50 capable of controlling the flow of exhaust gases between the cylinder 22 and the exhaust manifold 18. Each exhaust valve 50 is partially disposed in the exhaust port 48 and can move relative to the exhaust port 48 between an open position and a closed position along the direction indicated by double arrows C. When the exhaust valve 50 is in the open position, exhaust gases can flow from the cylinder 22 to the exhaust manifold 18 through the exhaust port 48. When the exhaust valve 50 is in the closed position, exhaust gases are precluded from flowing between the cylinder 22 and the exhaust manifold 18 through the exhaust port 48. A second cam phaser 52, which is part of the powertrain 12, can control the movement of the exhaust valve 50. Furthermore, the second cam phaser 52 can operate independently of the first cam phaser 44.

The powertrain 12 additionally includes a control module 54 in electronic communication with the internal combustion engine 14. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. In the depicted embodiment, the control module 54 includes at least one processor 56 and at least memory 58 (or any non-transitory, tangible computer readable storage medium). The memory 58 can store controller executable instruction sets, and the processor 56 can execute the controller executable instruction sets stored in the memory 58.

The control module 54 is specifically programmed to execute the steps of the method 100 (FIG. 2), the method 200 (FIG. 3), and method 300 (FIG. 4) (as discussed in detail below) and can receive inputs from various sensors. For example, the powertrain 12 may include a first pressure sensor 60 in communication (e.g., electronic communication) with the intake manifold 16 and the control module 54. The first pressure sensor 60 may be a manifold absolute pressure (MAP) sensor and is capable of measuring the pressure of the gases (e.g., air) in the intake manifold 16 (i.e., the intake manifold pressure). In operation, the first pressure sensor 60 can send input signals to the control module 54 that are indicative of the pressure of the gases (e.g., air) in the intake manifold 16. Upon receipt of the input signals from the first pressure sensors 60, the control module 54 can determine the intake manifold pressure. Alternatively or additionally, the powertrain 12 may include a mass air flow (MAF) sensor in electronic communication with the intake manifold 16 and the control module 54.

The powertrain 12 may also include a second pressure sensor 62 in communication (e.g., electronic communication) with the control module 54 and the exhaust manifold 18. The second pressure sensor 62 may be an exhaust back pressure sensor and is capable of determining the pressure of the gases in the exhaust manifold (i.e., the exhaust manifold pressure). In operation, the second pressure sensor 62 can send input signals to the control module 54 that are indicative of the exhaust manifold pressure. Upon receipt of these input signals, the control module 54 can determine the exhaust manifold pressure.

The control module 54 is also in communication with the first and second cam phasers 44, 52 and can therefore control the operation of the intake and exhaust valves 42, 50. As discussed above, the first and second cam phasers 44, 52 can operate independently of each other.

Figure 2:
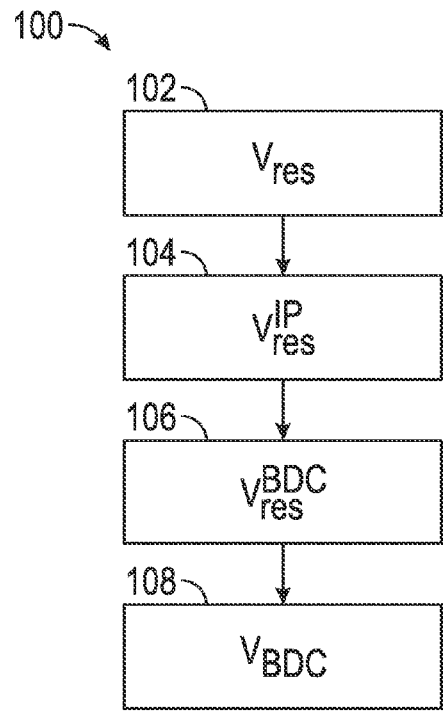
FIG. 2 is a flowchart of a method for determining the total residual gas volume in an internal combustion engine and the cylinder charge when the piston is at BDC.

FIG. 2 is a flowchart of a method 100 for determining (or at least estimating) a total residual gas volume $V_{res}^{BDC}$ when the piston 30 is at the BDC position for each engine cycle. During operation of the internal combustion engine 14, the residual gases are usually trapped in the cylinder 22. In addition to the fresh air originating from the intake manifold 16, those residual gases trapped in the cylinder 22 affect the volumetric efficiency of the internal combustion engine 14. Because the control module 54 takes into account the volumetric efficiency of the internal combustion engine 14 in order to predict the air charge in the cylinder 22, it is useful to determine (or a least estimate) the total residual gas volume $V_{res}^{BDC}$ when the piston 30 is at the BDC position.

The method 100 can be used to determine the total residual gas volume $V_{res}^{BDC}$ when the piston 30 is at the BDC position for each engine cycle, can be executed by the control module 54, and begins at step 102. Step 102 entails determining, via the control module 54, a residual gas volume in the cylinder 22 originating from a current engine cycle $V_{res}$. In other words, the control module 54 is specifically programmed to determine a residual gas volume in the cylinder 22 originating from a current engine cycle $V_{res}$. An exemplary method for the determining the residual gas volume in the cylinder 22 originating from a current engine cycle $V_{res}$ is discussed below in detail with respect to FIG. 3. As discussed in detail below, the residual gas volume in the cylinder 22 originating from a current engine cycle $V_{res}$ may be referred to as the cylinder residual gas volume $V_{res}$ and depends, at least in part, on the exhaust valve timing. For instance, if the exhaust valve 50 closes (i.e., moves to the closed position) before the exhaust stroke of the internal combustion engine 14 is completed, some residual gas from the combustion stays in the cylinder 22. In other words, not all the exhaust gases from the combustion exit the cylinder 22 through the exhaust port 48 because the exhaust valve 50 closes before the exhaust stroke is completed. The method 100 then proceeds to step 104. In summary, step 102 entails determining, via the control module 54, a residual gas volume in the cylinder 22 originating from the current engine cycle based, at least in part, on an intake manifold pressure and an exhaust manifold pressure.

Step 104 entails determining, via the control module 54, a residual gas volume forced into the intake port 40 in a previous engine cycle and re-inducted to the cylinder 22 in the current cycle $V_{res}^{IP}$. The residual gas volume forced into the intake port 40 in a previous engine cycle and re-inducted to the cylinder 22 in the current cycle $V_{res}^{IP}$, may be referred to as the intake port residual gas volume $V_{res}^{IP}$ and depends, at least in part, on the intake valve timing. For instance, if the intake valve 42 closes (i.e., moves to the closed position) after the intake stroke of the internal combustion engine 14, some residual gas from the combustion flows into the intake port 40. In the next engine cycle, that residual gas in the intake port 40 is re-inducted into the cylinder 22. An exemplary method for determining the intake port residual gas volume $V_{res}^{IP}$ is discussed in detail below with respect to FIG. 4. Thus, the control module 54 can be specifically programmed to determine the intake port residual gas volume $V_{res}^{IP}$. Step 104 may be executed before or after executing step 102. Regardless of the order, after executing steps 102 and 104, the method 100 continues to step 106. In summary, step 104 entails determining, via the control module 54, a residual gas volume in the intake port 40 originating from at least one previous engine cycle based, at least in part, on the intake manifold pressure and the exhaust manifold pressure.

Step 106 entails determining, via the control module 54, the total residual gas volume $V_{res}^{BDC}$ when the piston 30 is at the BDC position for each engine cycle. The total residual gas volume $V_{res}^{BDc}$ when the piston 30 is at the BDC position for each engine cycle may be referred to as the total residual gas volume $V_{res}^{BDC}$ and is based, at least in part on, the cylinder residual gas volume $V_{res}$ and the intake port residual gas volume $V_{res}^{IP}$. In other words, the control module 54 is specifically programmed to determine the total residual gas volume $V_{res}^{BDC}$ based, at least in part on, the cylinder residual gas volume $V_{res}$ and the intake port residual gas volume $V_{res}^{IP}$. Specifically, the total residual gas volume $V_{res}^{BDC}$ can be determined using Equation (1).

$$V_{res}^{BDC}(n) = k_1 V_{res}^{IP}(n) + \left(\frac{p_{EM}}{p_{IM}}\right)^{\frac{1}{\gamma}} V_{res}(n) \quad (1)$$

wherein:

n is the number of the engine cycle (i.e., the current engine cycle);

$k_1$ is a constant to account for the residual gas volume reduction due to heat transfer at the intake port 40 until the residual gas is re-inducted into the cylinder 22 in the next cycle ($0 < k_1 < 1$);

$V_{res}^{IP}(n)$ is the residual gas volume forced into the intake port 40 in a previous engine cycle and re-inducted to the cylinder 22 in the current cycle;

$P_{IM}$ is intake manifold pressure;

$P_{EM}$ is exhaust manifold pressure;

$\gamma$ is the ratio of specific heats for an ideal gas;

$V_{res}(n)$ is the residual gas volume in the cylinder 22 originating from the current engine cycle; and $V_{res}^{BDC}(n)$ is the total residual gas volume when the piston 30 is at the BDC position for the current engine cycle.

To determine the intake manifold pressure $P_{IM}$, the control module 54 can receive an input signal from the first pressure sensor 60. In other words, the control module 54 can determine the intake manifold pressure $P_{IM}$ based on an input signal received from the first pressure sensor 60. Likewise, the control module 54 can receive an input signal from the second pressure sensor 62 and determine the exhaust manifold pressure $P_{EM}$ based on the input signal received from the second pressure sensor 62. Step 106 therefore entails measuring the intake manifold pressure $P_{IM}$ and the exhaust manifold pressure $P_{EM}$. The ratio of specific heats $\gamma$ is about 1.67 for a monoatomic gas and 1.4 for a diatomic gas. The control module 54 may store the ratio of specific heats $\gamma$ in the memory 58. In summary, step 106 entails determining, via the control module 54, a total residual gas volume when the cy piston 30 is at the BDC position based, at least in part, on the residual gas volume in the at least one cylinder originating from the current engine cycle and the residual gas volume in the at least one cylinder originating from at least one previous engine cycle.

The method 100 may include an additional step 108. Step 108 entails determining, via the control module 54, cylinder charge volume when the piston 30 is at the BDC position $V_{BDC}$. The cylinder charge volume when the piston 30 is at the BDC position $V_{BDC}$ is equal to the sum of the total residual gas volume $V_{res}^{BDC}$ determined in step 106 and the fresh air volume in the cylinder 22 when the piston 30 is at the BDC position.

Figure 3:
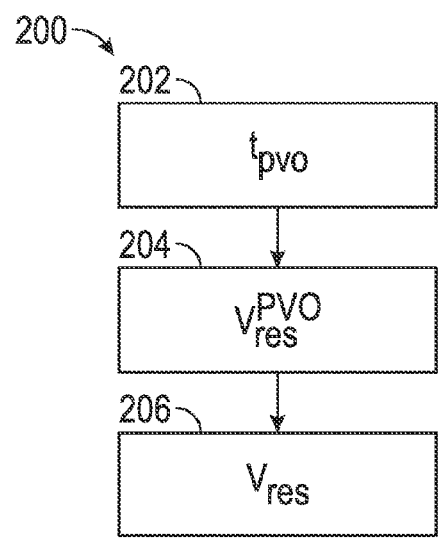
FIG. 3 is a flowchart of a method for determining the residual gas volume in the cylinder originating from the current engine cycle.

FIG. 3 is a flowchart of a method 200 for determining the residual gas volume in the cylinder 22 originating from the current engine cycle $V_{res}$. (i.e., the residual gas volume $V_{res}$). The method 200 can be executed by the control module 54 and begins with step 202. Step 202 entails determining, via the control module 54, a positive valve overlap time $t_{PVO}$. In the present disclosure, the term "positive valve overlap time" means a time elapsed from intake valve opening to either a moment when the piston 30 reaches a predetermined crank angle $k_2$ (e.g., zero degrees) if the exhaust valve 50 closes after the piston 30 reaches the predetermined crank angle or exhaust valve closing if the exhaust valve 50 closes before the piston 30 reaches the predetermined crank angle. In the present disclosure, the term "positive valve overlap (PVO)" refers to the situation in which the intake valve 42 opens before the exhaust valve 50 closes. During PVO, a portion of the residual gas is pushed into the intake port 40 until the exhaust valve 50 closes. The predetermined crank angle $k_2$ used to determine the positive valve overlap time $t_{PVO}$ refers to a specific crank angle around or at TDC (i.e., zero degrees crank angle) where the speed of the piston 30 is slow enough so that exhaust gas is not pushed into the intake port 40 any longer but re-inducted into the cylinder 22 as the piston 30 moves down after reaching the predetermined crank angle $k_2$. Given that the predetermined crank angle $k_2$ may be zero degrees and therefore corresponds to the TDC position of the piston 30, the positive valve overlap time $t_{PVO}$ may refer to the time elapsed from the intake valve opening to either a moment when the piston 30 reaches the TDC position if the exhaust valve 50 closes after the piston 30 reaches the TDC position or the moment when the exhaust valve 50 closes if the exhaust valve 50 closes before the piston 30 reaches the TDC position. Specifically, the control module 54 can determine the positive valve overlap time $t_{PVO}$ using Equation (2):

$$t_{PVO} = \max(\min(EVC_{EFF}, k_2) - \min(IVO_{EFF}, k_2), 0) \times \frac{120}{RPM \times N_{cyl}} \quad (2)$$

wherein:
RPM is engine speed in revolutions per minute;
$N_{cyl}$ is the number of cylinders;
$EVC_{EFF}$ is the effective closing timing of the exhaust valve 50 considering flow restriction due to the piston speed;
$k_2$ is the specific crank angle around or at TDC (i.e., zero degrees crank angle) where the speed of the piston 30 is slow enough so that exhaust gas is not pushed into the intake port 40 any longer but re-inducted into the cylinder 22 as the piston 30 moves down; and $IVO_{EFF}$ is the effective opening timing of the intake valve 42 considering flow restriction due to the piston speed.

The effective closing timing of the exhaust valve 50 $EVC_{EFF}$ (i.e., the effective exhaust valve closing timing $EVC_{EFF}$) and the effective opening timing of the intake valve 42 $IVO_{EFF}$ (i.e., the effective intake valve opening timing $IVO_{EFF}$) can be determined using Equations (3) and (4), respectively:

$$EVC_{EFF} = EVC - D_{EVC} \quad (3)$$

wherein:
EVC is the geometrical closing timing of the exhaust valve 50 (in crank angle); and
$D_{EVC}$ is the difference between the geometrical and effective closing timing of the exhaust valve 50 (in crank angle).

$$IVO_{EFF} = IVO + D_{IVO} \quad (4)$$

wherein:
IVO is the geometrical opening timing of the intake valve 42 (in crank angle); and
$D_{IVO}$ is the difference between the geometrical and effective opening timing of the intake valve 42 (in crank angle).

The difference between the geometrical and effective intake valve opening timing $D_{IVO}$ and the difference between the geometrical and effective exhaust valve closing timing $D_{EVC}$ can be determined by testing the internal combustion engine 14. After determining the positive valve overlap time $t_{PVO}$, the method 200 proceeds to step 204. Step 204 entails determining, via the control module 54, the volume of exhaust gas pushed into the intake port 40 and re-inducted into the cylinder 22 during the current engine cycle $V_{res}^{PVO}$. To do so, the control module 54 may use equation (5).

$$V_{res}^{PVO} = k_3 \times \phi(p_{IM}, p_{EM}) \times t_{PVO} \quad (5)$$

where $$\phi(p_{IM}, P_{EM}) = \begin{cases} \left(\frac{p_{IM}}{p_{EM}}\right)^{1/\gamma} \left\{\frac{2\gamma}{\gamma-1}\left(1-\left(\frac{p_{IM}}{p_{EM}}\right)^{(\gamma-1)/\gamma}\right)\right\}^{1/2} & \text{if } \frac{p_{IM}}{p_{EM}} > 0.528 \\ \gamma^{1/2}\left(\frac{2}{\gamma+1}\right)^{(\gamma+1)/2(\gamma-1)} & \text{otherwise} \end{cases}$$

wherein:
$P_{IM}$ is intake manifold pressure;
$P_{EM}$ is exhaust manifold pressure;

$\gamma$ is the ratio of specific heats for an ideal gas;
$k_3$ is a positive constant converting a mass to a volume;
$t_{PVO}$ is positive valve overlap time determined in step 202; and
$V_{res}^{PVO}$ is the volume of exhaust gas pushed into the intake port 40 during PVO and re-inducted into the cylinder 22 during the current engine cycle.

To determine the intake manifold pressure $P_{IM}$, the control module 54 can receive an input signal from the first pressure sensor 60. In other words, the control module 54 can determine the intake manifold pressure $P_{IM}$ based on an input signal received from the first pressure sensor 60. Likewise, the control module 54 can receive an input signal from the second pressure sensor 62 and determine the exhaust manifold pressure $P_{EM}$ based on the input signal received from the second pressure sensor 62. The ratio of specific heats $\gamma$ is about 1.67 for a monoatomic gas and 1.4 for a diatomic gas. The control module 54 may store the ratio of specific heats $\gamma$ in the memory 58. In summary, the control module 54 is specifically programmed to determine the volume of exhaust gas pushed into the intake port and re-inducted into the cylinder $V_{res}^{PVO}$ during the current engine cycle using Equation (5) and the inputs from the first and second pressure sensors 60, 62. In other words, step 204 entails determining the residual gas volume in the intake port 40 originating from the current engine cycle based, at least in part, on the positive valve overlap time $t_{PVO}$.

After determining the volume of exhaust gas pushed into the intake port and re-inducted into the cylinder $V_{res}^{PVO}$ during the current engine cycle, the method 200 proceeds to step 206. Step 206 entails determining, via the control module 54, the residual gas volume in the cylinder 22 originating from the current engine cycle $V_{res}$. To do so, the control module 54 can use Equation (6):

$$V_{res}(n) = k_4 V_{EVC}(n) + \left(\frac{p_{IM}}{p_{EM}}\right)^{\frac{1}{\gamma}} V_{res}^{PVO}(n) \quad (6)$$

wherein:
n is the number of the engine cycle;
$V_{res}(n)$ is the residual gas volume in the cylinder 22 originating from the current engine cycle (i.e., $n^{th}$ engine cycle);
$k_4$ is a constant to consider volume reduction of the residual gas due to heat transfer ($0 < k_4 < 1$);
$V_{EVC}$ is the volume of exhaust gas in the cylinder 22 at exhaust valve closing;
$V_{res}^{PVO}$ is the volume of exhaust gas pushed into the intake port 40 and re-inducted into the cylinder 22;
$P_{IM}$ is intake manifold pressure;
$P_{EM}$ is exhaust manifold pressure;
$\gamma$ is the ratio of specific heats for an ideal gas; and
$V_{res}$ is the residual gas volume in the cylinder 22 originating from the current engine cycle.

As discussed above, the control module 54 can determine the intake manifold pressure $P_{IM}$ and exhaust manifold pressure $P_{EM}$ based on inputs from the first and second pressure sensors 60, 62, respectively. In summary, the residual gas volume in the residual gas volume in the cylinder 22 originating from the current engine cycle $V_{res}$ is based, at least in part, on the positive valve overlap time $t_{PVO}$.

Figure 4:
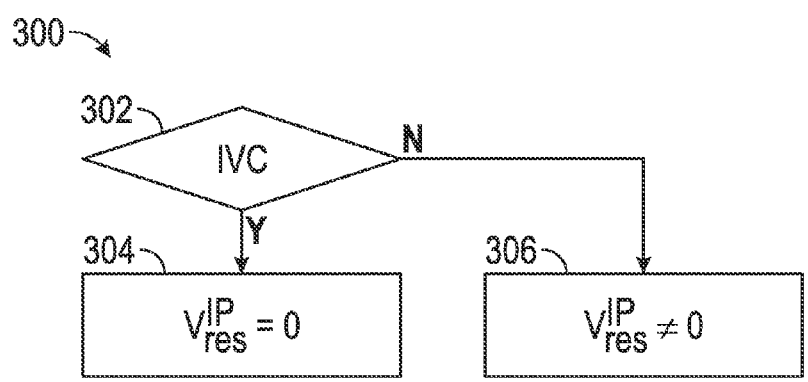
FIG. 4 is a flowchart of a method for determining intake port residual gas that will be re-inducted in the next engine cycle.

FIG. 4 is a flowchart of a method 300 for determining the intake port residual gas volume $V_{res}^{IP}$. During operation of the internal combustion engine 14, if the intake valve 42 closes after the piston 30 reaches the BDC position, some exhaust gases can flow into the intake port 40 during the compression stroke of the engine cycle. Thus, as the piston 30 moves upwards during the compression stroke of the engine cycle, some exhaust gases flow into the intake port 40 until the intake valve 42 closes. As the intake valve 42 closes, it traps that residual gas in the intake port 40. The residual gas trapped in the intake port 40 is re-inducted into the cylinder 22 when the intake valve 42 opens during the next engine cycle. It is thus useful to determine the intake port residual gas volume $V_{res}^{IP}$ that will be re-inducted into the cylinder 22 during the next engine cycle. To do so, the control module 54 executes the method 300, which begins at step 302.

Step 302 entails determining, via the control module 54, if the intake valve 42 closes before the piston 30 reaches the BDC position. To do, the control module 54 compares the intake valve closing timing IVC to the piston position in terms of crank angle CA as shown in Equation (7).

$$IVC < 180° \, CA \quad (7)$$

wherein:

IVC is the intake valve closing timing in crank angle; and CA is crank angle.

Thus, for each engine cycle, the control module 54 determines if the intake valve 42 closes before the crank angle CA (which is indicative of the piston position) is less than one hundred eighty degrees (180°). If the intake valve 42 closes when the crank angle CA (which is indicative of the piston position) is less than one hundred eighty degrees (180°), then the method 300 proceeds to step 304. In step 304, the control module 54 determines that the intake port residual gas volume $V_{res}^{IP}$ that will be re-inducted into the cylinder 22 during the next engine cycle is zero. In other words, if the intake valve 42 closes when the crank angle CA (which is indicative of the piston position) is less than one hundred eighty degrees (180°), then the intake port residual gas volume $V_{res}^{IP}$ that will be re-inducted into the cylinder 22 during the next engine cycle is zero. Conversely, if the intake valve 42 closes before the crank angle CA (which is indicative of the piston position) is equal to or greater than one hundred eighty degrees (180°), then the method 300 continues to step 306. In step 306, the control module 54 determines the intake port residual gas volume $V_{res}^{IP}$ that will be re-inducted into the cylinder 22 during the next engine cycle by using Equation (8).

$$V_{res}^{IP}(n+1) = V_{res}^{BDC}(n) \times (1-r) \quad (8)$$

where $$r = \frac{V_{IVC}(n)}{V_{BDC}(n)}$$

wherein:

$V_{res}^{BDC}(n)$ is total residual gas volume when the piston 30 is at the BDC position for the current engine cycle;

$V_{IVC}(n)$ is the cylinder volume when the intake valve 42 closes during current engine cycle;

$V_{BDC}(n)$ is the cylinder volume when the piston 30 is at the BDC position for the current engine cycle;

$V_{res}^{IP}(n+1)$ is the volume of the residual gas trapped in the intake port 40 that will be re-inducted into the cylinder 22 during the next engine cycle.

Thus, the residual gas volume in the at least one intake port originating from the at least one previous engine cycle $V_{res}^{IP}$ is zero if the at least intake port 42 closes before a crank angle is equal to or less than 180 degrees. Further, the residual gas volume in the at least one intake port originating from the at least one previous engine cycle $V_{res}^{IP}$ is based, at least in part, on the exhaust manifold pressure and the intake manifold pressure if the at least one intake port 42 closes after the crank angle is greater than 180 degrees.

While the best modes for carrying out the invention have been described in detail, those familiar with the art to which this invention relates will recognize various alternative designs and embodiments for practicing the invention within the scope of the appended claims.

The invention claimed is:

1. A method of determining a total residual gas volume when a piston of an internal combustion engine is at a bottom dead center (BDC) position, the internal combustion engine being in fluid communication with an intake manifold and an exhaust manifold, the internal combustion engine including an engine block, the engine block defining at least one cylinder, the piston being movable within the at least one cylinder, at least one intake port being in fluid communication with the at least one cylinder and the intake manifold, and at least one exhaust port being in fluid communication with the at least one cylinder and the exhaust manifold; the method comprising:

measuring an intake manifold pressure and an exhaust manifold pressure;

determining, via a control module, a residual gas volume in the at least one cylinder originating from a current engine cycle based, at least in part, on the intake manifold pressure and the exhaust manifold pressure;

determining, via the control module, a residual gas volume in the at least one intake port originating from at least one previous engine cycle based, at least in part, on the intake manifold pressure and the exhaust manifold pressure; and determining, via the control module, a total residual gas volume when the piston is at the BDC position based, at least in part, on the residual gas volume in the at least one cylinder originating from the current engine cycle and the residual gas volume in the at least one cylinder originating from at least one previous engine cycle.

2. The method of claim 1, wherein the residual gas volume in the residual gas volume in the at least one cylinder originating from the current engine cycle is based, at least in part, on a positive valve overlap time.

3. The method of claim 2, wherein the positive valve overlap time is a time elapsed between an intake valve opening and an exhaust valve closing if the at least one exhaust valve closes before the piston reaches a top dead center (TDC) position.

4. The method of claim 3, wherein the positive valve overlap time is a time elapsed between the intake valve opening and a moment when the piston reaches the TDC position if the at least one exhaust valve closes after the piston reaches the TDC position.

5. The method of claim 4, wherein determining the residual gas volume in the at least one cylinder originating from the current engine cycle includes determining a residual gas volume in the at least one intake port originating from the current engine cycle based, at least in part, on the positive valve overlap time.

6. The method of claim 1, wherein the residual gas volume in the at least one intake port originating from the at least one previous engine cycle is zero if the at least intake valve closes when a crank angle is equal to or less than 180 degrees.

7. The method of claim 6, wherein the residual gas volume in the at least one intake port originating from the at least one previous engine cycle is based, at least in part, on the exhaust manifold pressure and the intake manifold pressure if the at least one intake valve closes when the crank angle is greater than 180 degrees.

8. The method of claim 1, further comprising determining, via the control module, the intake manifold pressure based on an input signal from a first pressure sensor in communication with the intake manifold and the control module.

9. The method of claim 8, further comprising determining, via the control module, the exhaust manifold pressure based on an input signal from a second pressure sensor in communication with the exhaust manifold and the control module.

10. A powertrain, comprising:
an intake manifold;
an internal combustion engine including an engine block, the engine block defining at least one cylinder, at least one piston movable within the at least one cylinder, at least one intake port in fluid communication with the at least one cylinder, and at least one exhaust port in fluid communication with the at least one cylinder;
a control module programmed to:
determine a residual gas volume in the at least one cylinder originating from a current engine cycle based, at least in part, on an intake manifold pressure and an exhaust manifold pressure;
determine a residual gas volume in the at least one intake port originating from at least one previous engine cycle based, at least in part, on the intake manifold pressure and the exhaust manifold pressure cycle; and
determine a total residual gas volume when the at least one piston is at a bottom dead center (BDC) position based, at least in part, on the residual gas volume in the at least one cylinder originating from the current engine cycle and the residual gas volume in the at least one cylinder originating from at least one previous engine cycle.

11. The powertrain of claim 10, wherein the residual gas volume in in the at least one cylinder originating from the current engine cycle is based, at least in part, on a positive valve overlap time.

12. The powertrain of claim 11, wherein the positive valve overlap time is a time elapsed between an intake valve opening and an exhaust valve closing if the at least one exhaust valve closes before the at least one piston reaches a top dead center (TDC) position.

13. The powertrain of claim 12, wherein the positive valve overlap time is a time elapsed between the intake valve opening and a moment when the at least one piston reaches the TDC position if the at least one exhaust valve closes after the at least one piston reaches the TDC position.

14. The powertrain of claim 13, wherein the control module is programmed to determine a residual gas volume in the at least one intake port originating from the current engine cycle based, at least in part, on the positive valve overlap time.

15. The powertrain of claim 14, wherein the residual gas volume in the at least one intake port originating from the at least one previous engine cycle is zero if the at least intake port closes before a crank angle is equal to or less than 180 degrees.

16. The powertrain of claim 15, wherein the residual gas volume in the at least one intake port originating from the at least one previous engine cycle is based, at least in part, on the exhaust manifold pressure and the intake manifold pressure if the at least one intake port closes after the crank angle is greater than 180 degrees.

* * * * *